May 13, 1947. C. C. WHITE 2,420,456
FABRIC ENVELOPE FOR STORAGE BATTERY PLATES
Filed April 29, 1943
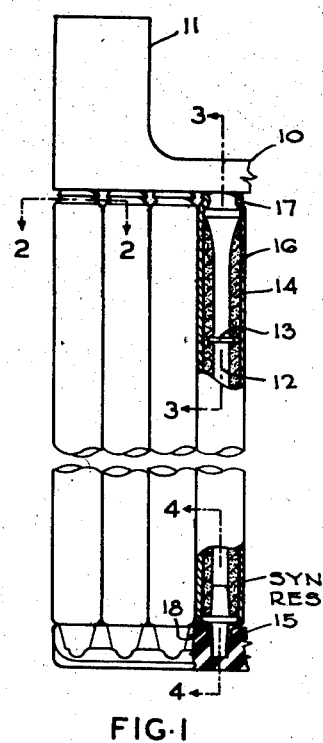
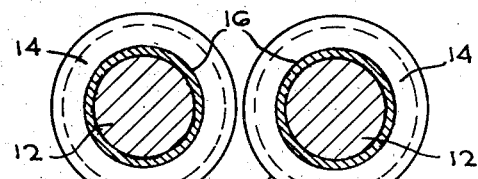
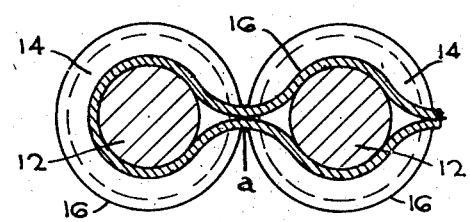
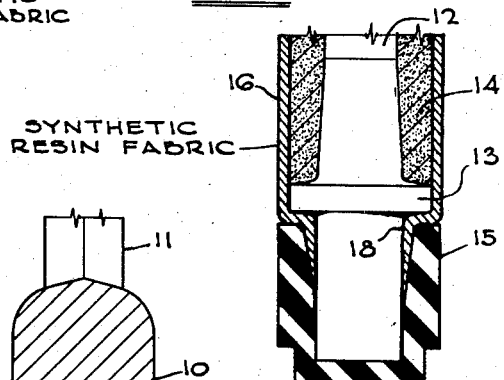
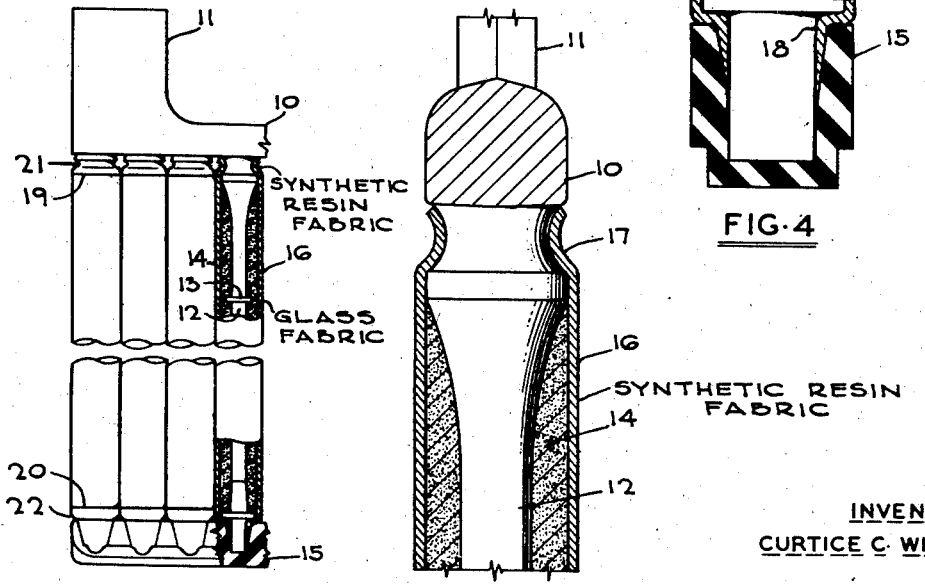
INVENTOR
CURTICE C. WHITE
BY
Augustus B. Stoughton
ATTORNEY Patented May 13, 1947

2,420,456

UNITED STATES PATENT OFFICE 2,420,456

FABRIC ENVELOPE FOR STORAGE BATTERY PLATES

Curtice Chandler White, Johnsville, Pa., assignor to The Electric Storage Battery Company, a corporation of New Jersey Application April 29, 1943, Serial No. 484,949

11 Claims. (Cl. 136—55)

This invention relates to the construction of retainers for storage batteries, and, more particularly, to the construction of retainers for preventing or retarding the dislodgment of the active material from the surface of the plate.

The invention has for an object the production of an improved retainer for storage battery plates and a novel process for the production of such retainer.

Another object is the production of an improved and highly effective retainer fabricated from threads or filaments of an artificial or synthetic resin, highly resistant to the electrolytic oxidizing actions present in a storage battery cell, said retainer having suitable porosity to permit access of electrolyte and passage of current therethrough to the active material of the plate while preventing the escape of such active material under service conditions.

Another object is the production, from a highly flexible thread of artificial resin, of a retainer of tubular type which may be easily and quickly applied to individual cylindrical pencils of the plate during assembly and thereafter shrunken to closely grip said pencils.

Another object is the production of a retainer of the tubular type consisting, over the greater part of its length, of knitted fabric of glass threads but, at one or both of whose ends, the knitted fabric is of artificial or synthetic resin or plastic threads which, after assembly on the cylindrical pencil, is shrunken at elevated temperature to grip the end or ends of the pencil to prevent the escape of active material at those points, and to prevent relative longitudinal displacement of the retainer.

Further objects and advantages of this invention will become apparent as the following detailed description proceeds, and the features of novelty which characterize this invention will be set forth in the claims annexed to and forming a part of this specification.

For a more complete understanding of this invention, reference should be had to the following description of certain preferred embodiments thereof, read in connection with the accompanying drawings in which:

Figure 1 shows, in elevation and partly in section, a portion of a storage battery plate of the tubular type embodying features of the invention.

Figure 2 is a horizontal section on the line 2—2 of Figure 1, drawn to an enlarged scale.

Figure 3 is a vertical section taken on the line 3—3 of Figure 1 and drawn to an enlarged scale.

Figure 4 is a vertical section of the lower end of one of the pencils and the bottom bar taken on the line 4—4 of Figure 1 and drawn to an enlarged scale.

Figure 5 is a horizontal section similar to Figure 2 showing a modified form of fabric sleeve, and Figure 6 shows, in elevation, a modification partly in section in which the tubular retainers are fabricated of glass threads or fibers over the greater portion of their length, while the ends are fabricated of artificial resin threads or fibers.

Referring to Figure 1, there is shown a portion of a storage battery plate of the tubular or pencil type comprising a metallic top bar 10 provided with the usual terminal lug 11 and a series of depending conducting spines 12, each of said spines being surrounded by a cylindrical pencil of active material 14. The term "active material," as used herein, is intended to include the material applied to the grid whether potentially or actually active, i. e., whether before or after the initial forming charge.

The spines are provided at intervals along their length with the usual annular collars 13. Surrounding the active material and snugly applied thereto is a retainer in the form of a sleeve 16 of knitted or woven fabric produced from threads or filaments of a synthetic resin or plastic inert to the oxidizing action in a storage battery.

One of the novel and highly useful features of this invention resides in the fact that the fabric sleeve, when first applied to the pencil, is of such diameter as to provide a comparatively loose fit so that it can be readily and expeditiously slipped over the pencil during assembly, and thereafter, by the introduction of a novel step in the process, the sleeve is shrunk so as tightly to grip the pencil and still further shrunk over the upper and lower ends around the projecting ends of the spine as shown at 17 and 18 in Figures 1, 3 and 4. This gripping effect of the fabric sleeve on the active material of the pencil and around the projecting ends of the spine is much greater than could be secured by merely drawing an elastic sleeve over the pencil without subsequent shrinkage, with the result that the active material is more securely retained in place under service conditions and the life of the plate is prolonged. Further, the forces produced by the shrinkage tend to produce and maintain a better contact between the active material 14 and the spines 12.

For producing the fabric for the retainer involving features of this invention, there is employed a synthetic resin inert to the powerful oxidizing and electro-chemical reactions in a storage battery cell and capable of being produced in the form of a thread suitable for weaving or knitting. The synthetic resins which have been found to be suitable for carrying out this invention are acid-resisting solid linear polymers the principal chain of which is a straight chain single bond carbon to carbon linkage. Among these polymers, solid polymerized vinyl esters such as polyvinyl chloride, polyvinyl acetate and their copolymers; the acrylic resins, such as polymerized methyl-methacrylate and ethyl-methacrylate; and polystyrene have been found to be particularly suitable.

It is customary in the manufacture of thread from such resins to orient the molecules in order to add sufficient strength and elasticity to the thread to permit weaving or knitting. This orientation may be produced by a stretching operation at elevated temperatures and subsequent cooling or by other methods. In accordance with this invention, it has been found that, if thread thus oriented is subsequently subjected to a critical elevated temperature lower than that required to produce softening of the material or "tackiness" at the surface, it will shrink by a substantial fraction of its original length without sacrifice of strength or elasticity.

In accordance with this invention, the oriented thread is knit or woven into the desired tubular form, either as separate tubes, as illustrated in Figures 1, 2 and 3, or as a glove-like sleeve provided with a series of tubular pockets for the reception of the individual pencils, as illustrated in Figure 5. The individual tubes may be woven or knitted by any of the well-known methods. The glove-like sleeve may be produced by interconnecting the opposite sides of the sleeve at spaced intervals by vertical seams a, as illustrated in Figure 5, or by interlacing the threads of opposite faces at spaced intervals during the weaving or knitting process, as disclosed in co-pending application Serial Number 421,088, by Ernest Graf, filed December 1, 1941, now Patent Number 2,350,752, dated June 6, 1944, assigned to the assignee of this application.

The dimensions of the tubes or pockets are such as to fit somewhat loosely over the pencils to facilitate assembly and to extend a short distance beyond the active material at both ends. The projecting ends of the tubes at the top may be shrunken over the projecting end of each spine, between the uppermost annular collar and the top bar of the plate, as shown most clearly at 17 in Figure 3, by means of a heated tool, and any surplus then trimmed off. At the lower ends of the pencils, a plastic bottom bar 15, shown in Figure 4, is applied by a molding operation at an elevated temperature. This operation shrinks the lower ends of sleeves 16 around the projecting ends of the spines 12 and, at the same time, embeds the projecting ends of the spines and the surrounding sleeves in the bottom bar to rigidly interconnect the pencils into a unitary structure. A preferred method of applying such a bottom bar is disclosed in my co-pending application, Serial Number 424,510, filed December 26, 1941, now Patent Number 2,373,281, dated April 10, 1945, and assigned to the assignee of this application.

After these steps in the process have been completed, the entire plate, consisting of a series of vertical pencils attached to top and bottom bars, is subjected to the critical temperature above referred to, as by enclosing in a heated oven or by immersing in hot water or hot dilute sulphuric acid at which temperature-marked shrinkage of the component threads of the fabric occurs without softening the material or causing tackiness at the surface. Such softening would impair the strength of the threads and tackiness would cause contiguous threads to adhere to each other, impairing the flexibility of the fabric.

For threads of polymerized methyl-methacrylate, a temperature between 170° and 200° F. has been found satisfactory for effecting the shrinkage; for polymerized ethyl-methacrylate and polystyrene, a temperature between 140° and 160° F. may be employed. For the other synthetic resins enumerated above, suitable temperatures below those producing tackiness or softening can readily be ascertained by those skilled in the art. After the shrinking operation, the plate is subjected to the usual further processing including the well-known initial forming operation.

A storage battery plate is thus produced comprising a series of vertically disposed pencils connected to suitable top and bottom bars, each pencil having a conducting spine surrounded by and embedded in active material, and enclosed in a tubular fabric retainer composed of mutually unattached threads of oriented filaments of a synthetic resin inert to the oxidizing and electro-chemical reactions in a storage battery cell, shrunken thereon with unimpaired strength and elasticity.

A modification of the process and product above described is illustrated in Figure 6 in which the tubular sleeves or glove-like retainer may be fabricated over a substantial part of their length, as between the lines 19 and 20, of threads of highly attenuated filaments of glass, while the end portions 21 and 22 of the sleeves are fabricated of threads or filaments of artificial resin. These end portions are subjected to the same shrinkage treatment described above, whereby the ends 21 and 22 of the sleeves projecting beyond the active material are shrunk around the projecting ends of the spines. The glass fabric portions of the pocket are made of such diameter as to closely surround and hold the active material on the spines. The glass and resin portions of the sleeves are separate. When, during manufacture, the resin portion has been completed, the glass thread is automatically introduced, replacing the plastic thread which is carried along independently by the machine until at the proper point it is automatically substituted for the glass thread. This method of substitution is well known in the knitting art.

While there has been illustrated and described specific embodiments of this invention, modifications thereof will be apparent to those skilled in the art. It is not desired, therefore, that this invention be limited to the specific embodiments shown and described and it is intended in the appended claims to cover all applications within the true spirit and scope of this invention.

I claim:

1. In a plate for use in a storage battery cell comprising a series of parallel pencils of active material having embedded therein conducting spines projecting beyond said active material and attached to top and bottom bars, the combination with said pencils of tubular fabric retaining sleeves composed of mutually unattached and initially molecularly oriented threads of synthetic resin resistant to the powerful oxidizing and electrochemical reactions in a storage battery cell, said sleeves shrunken on said pencils with unimpaired strength and elasticity so as tightly to grip said material to produce good electrical contact thereof with said spines and said sleeves partially covering the projecting ends of the spines and shrunken to engage said projecting ends of the spines and confine the exposed ends of the active material.

2. In a plate for use in a storage battery cell comprising a series of parallel pencils of active material having embedded therein conducting spines projecting beyond said active material and attached to top and bottom bars, the combination with said pencils of tubular fabric retaining sleeves composed of mutually unattached and initially molecularly oriented threads of synthetic resin resistant to the powerful oxidizing and electrochemical reactions in a storage battery cell, said sleeve shrunken on said pencils with unimpaired strength and elasticity so as tightly to grip said material to produce good electrical contact thereof with said spines, the threads of said shrunken fabric being entirely unconsolidated and free to stretch with the growth of said active material during use.

3. In a storage battery plate of the type having pencils of active material supported on spines which are secured to top and bottom bars, a tubular fabric retainer composed of initially molecularly oriented threads of synthetic resin selected from the class consisting of polymerized ethyl or methyl methacrylate, shrunken on said pencils of material and tightly gripping said material to produce good electrical contact thereof with said spines, the threads of said shrunken methacrylate fabric being entirely unconsolidated and free to stretch with the growth of the active material during use.

4. In a plate for use in a storage battery cell comprising a series of parallel pencils of active material having embedded therein conducting spines attached to top and bottom bars, the combination with said pencils of tubular fabric retaining sleeves composed of initially molecularly oriented and mutually unattached threads of synthetic resin resistant to the electrolyte and the electrolytic oxidizing action present in a storage battery cell selected from the class consisting of the vinyl resins, the acrylic resins and polystyrene, said fabric of said sleeves in a shrunken condition tightly gripping the active material on said pencils yet having unimpaired strength and elasticity.

5. In a plate for use in a storage battery cell comprising a series of parallel pencils of active material having embedded therein conducting spines attached to top and bottom bars, the combination with said pencils of tubular fabric retaining sleeves composed over the greater portion of their length of fabricated glass threads and over at least one end portion of initially molecularly oriented and mutually unattached threads of synthetic resin resistant to the electrolyte and the electrolytic oxidizing action present in a storage battery cell selected from the class consisting of the vinyl resins, the acrylic resins and polystyrene, said end portion in shrunken condition tightly gripping the corresponding portion of the pencil and yet having unimpaired strength and elasticity.

6. The steps in the production of storage battery plates of the type comprising pencils of active material supported on spines and enclosed by a tubular fabric sheath made from threads of molecularly oriented filaments of synthetic resin material capable of withstanding acid attack and resisting the powerful oxidizing effect within a storage battery and capable of appreciable shrinkage by the application of elevated temperature comprising: applying said fabric to said pencils of active material so that it loosely surrounds the pencils, and thereafter shrinking said fabric by the application of elevated temperature to cause longitudinal contraction of said threads so that it tightly grips said material and firmly holds it in place and in good electrical contact with said spines throughout the life of said battery.

7. The steps in the production of storage battery plates of the type comprising pencils of active material supported on spines and enclosed by a tubular fabric sheath made from threads of molecularly oriented filaments of synthetic resin material capable of withstanding acid attack and resisting the powerful oxidizing effect within a storage battery comprising: forming from a synthetic resin thread a fabric having tubular passageways of greater diameter than that of said pencils of active material on said spines, applying said fabric to said pencils, and by the application of heat causing longitudinal contraction of its threads, thereby shrinking said fabric onto said pencils, the amount of heat being insufficient to cause softening of the individual threads of said fabric but being sufficient to cause said fabric to tightly engage said pencils and cause said material to become and remain in good electrical contact with said spines.

8. In a process for producing and applying a retainer to a storage battery plate of the type comprising a series of pencils of active material having embedded therein conducting spines with their ends projecting beyond the active material and attached to top and bottom bars, the steps of fabricating threads composed of molecularly oriented filaments of a synthetic resin selected from the class consisting of the vinyl resins, the acrylic resins and polystyrene into a retainer in the form of sleeves adapted loosely to fit over the pencils, applying said retainer by drawing said sleeves over the pencils with their ends surrounding the ends of the spines projecting beyond the active material, and shrinking said sleeves by the longitudinal contraction of said threads to firmly grip the active material and enclose the projecting ends of the spines by subjecting them to an elevated temperature below that at which softening or tackiness of the resin is produced.

9. A storage battery plate of the type recited in which the active material is pressed against and maintained in good contact with the spines by the resilient compressive force of partially contracted fabric sleeves composed of mutually unattached initially molecularly oriented threads of a synthetic resin characterized by its resistance to the electrolyte and the electrolytic oxidizing action present in a storage battery cell and its ability to maintain its elasticity in a partially contracted state so as to accommodate without rupture the growth of the active material during operation of the storage battery cell.

10. The process of making a storage battery plate of the type recited which consists in mounting over size fabric sleeves composed of molecularly oriented filaments of synthetic resin insoluble in the electrolyte and resistant to the oxidizing and electrochemical reactions present in a storage battery cell, contracting the sleeves in situ throughout their length and without loss of elasticity to grip the active material by exposing the plates to an agent adapted to cause longitudinal contraction of the molecularly oriented threads of the fabric sleeves and, after the desired contraction has taken place, removing the plates from the action of the agent.

11. In a storage battery plate, the combination of a conducting member, active material or material to become active on said conducting member, and a fabric envelope composed of initially molecularly oriented and mutually unattached threads of synthetic resin resistant to the powerful oxidizing and electrochemical reactions in a storage battery, said envelope inclosing said conducting member and said material thereon and shrunken to grip said material firmly and provide a retainer of reduced porosity therefor.

CURTICE CHANDLER WHITE.

REFERENCES CITED

The following references are of record in the file of this patent:

UNITED STATES PATENTS

| Number | Name | Date |
|---|---|---|
| 2,257,018 | White | Sept. 23, 1944 |
| 2,027,962 | Currie | Jan. 14, 1936 |
| 2,262,861 | Rugeley et al. | Nov. 18, 1941 |

OTHER REFERENCES

Richardson, H. M. Electrical World, April 17, 1943, pages 67, 68.

Goggin et al., Modern Plastics, July 1944, page 101.